Patented Feb. 19, 1935

1,991,590

UNITED STATES PATENT OFFICE 1,991,590

GERMICIDE

Wallace J. Yates, Martinez, Calif., assignor to Shell Development Company, San Francisco, Calif., a corporation of Delaware No Drawing. Application October 6, 1930, Serial No. 486,863

2 Claims. (Cl. 167—22)

The germicides that comprise my invention are obtained from the extract of the Edeleanu process, as a by-product. In the Edeleanu process certain compounds, mostly aromatic, are removed by means of sulfur dioxide from such products as gasoline, kerosene and lubricating oils in which their presence is undesirable. These aromatic and other compounds soluble in liquid sulphur dioxide are extracted therewith, leaving the insoluble components of the oils, mostly paraffins and naphthenes. The mostly aromatic oil dissolved out by the sulfur dioxide is termed the Edeleanu extract. The sulfur dioxide is recovered from the extract and returned to the system: This is accomplished by distilling off the sulfur dioxide, it being easily separated from the extract due to its very volatile character. However, complete separation cannot be effected this way, a little of the sulfur dioxide remaining in the oil. This last trace is removed by treating with caustic soda or other alkalies.

On acidifying the alkali used for the removal of the final traces of sulphur dioxide from the Edeleanu extract, an oil, the analysis of which is shown elsewhere, separates. It has been found that these acidic bodies possess extremely high germicidal properties. The kerosene and gasoline Edeleanu extracts were found to be richest in this germicidal material, and I have used these preferably. These acidic bodies comprised only about 0.1% of the extract after the removal of the sulphur dioxide.

On analysis of this crude acid obtained from the soda treatment of the extract it was found to contain naphthenic acids, certain complex phenols and a small amount of neutral oil, the amounts of each varying somewhat with the chemical composition of the hydrocarbons from which they were produced. The term "complex phenols" is employed to designate that part of the mixture of compounds removed from Edeleanu extract which are characterized by their weak acidic properties, e. g., are extractable from a weakly alkaline aqueous solution with ether in contrast to the other part of the mixture termed "naphthenic acids" which, owing to their relatively stronger acidic properties produce compounds (soap) by reaction with caustic soda which are not hydrolyzed sufficiently in alkaline solution to be appreciably extractable with ether. These weakly acidic compounds (referred to as "complex phenols") may also comprise the hydroxy derivatives of naphthenic compounds, or other cyclic partially or completely saturated compounds, and their homologues, oxygenated or sulfonated hydrocarbons, etc.

The term "complex phenols" is used, then, as a somewhat arbitrary term to include the mixture of extremely complex feebly acidic substances present in Edeleanu extract which are recovered together with phenols, and without attempting to define their true chemical structure.

The following table shows the composition, percent by weight, of two germicidal crude acids obtained from kerosenes of different geographic origin.

| Composition | I | II |
|---|---|---|
| Naphthenic acids | 61.3 | 62.3 |
| Complex phenols | 28.4 | 34.4 |
| Neutral oil | 10.3 | 3.3 |

These two analyses are very similar; however, in many cases I expect the composition of the acids to vary considerably from these figures.

The phenol coefficients of these substances in crude acid I were determined and found to be as follows:

Naphthenic acids _____ 3.3
Complex phenols _____ 15.5

These values are based on the coefficient of carbolic acid which is taken at a value of one, and they clearly show the very high germicidal properties of these acids and phenols. The germicides of my invention consist either of the crude acids of compositions similar to those mentioned above, or I may use either the complex phenols or the naphthenic acids mentioned above, depending on the purpose for which it is desired to use them.

There are many practical uses for my germicides. They can be used medicinally to great advantage as a superior substitute for known germicides in many ways in which they are employed. The complex phenols possess germicidal powers far in excess of the average disinfectant and considering their possible range of dilution they are easily adaptable to a wide variety of uses.

I have prepared a very effective poultry spray by using a mixture of 25% by volume of my crude germicidal acids and 75% insecticidal oil. The insecticidal oil chosen was the extract obtained from the Edeleanu treatment of an orchard spray oil of about 60 Saybolt viscosity at 100° F. This extract has proven to be not too volatile nor too heavy for a poultry spray, and has good insecticidal properties though only a very slight germicidal value. Somewhat lighter oil can be used, though even oils of the kerosene range usually evaporate too quickly; heavier oils soon leave too much of an oily residue in the poultry houses which tends to rub off on the chickens. As insecticidal oils Edeleanu extracts are preferable to untreated oils, which are in turn preferable to highly refined oils, since Edeleanu extracts are better insecticides than the untreated oils, which are in turn more effective insecticides than the treated oils. However, any oil can be made more effective as a pultry spray by the addition of my germicide. This spray has the advantage of performing a double purpose. As an insecticide, it is deadly to vermin and small insects and at the same time, as a germicide, it is a powerful agent in destroying germs of different diseases and infections that are a menace to domestic birds.

Poultry sprays prepared with 25% of the crude acids as shown in the above table, and 75% insecticide oil, as described above, had phenol coefficients varying from 0.8 to 1.58. The strength of my poultry spray may be easily varied to suit particular requirements by changing the relative amounts of germicide and insecticide oil. I do not limit myself to any definite proportion; however, I prefer to use one part germicide and three parts insecticide oil.

Another use for the germicides of my invention is that of insecticides; particularly in the protection of lumber against termites have they proven very effective. I have obtained good results by a solution of my crude germicidal acid in four to ten times the volume of a rather heavy petroleum distillate as stove oil; the diluent must not be too light as this would cause too quick evaporation, nor too heavy to penetrate the lumber readily.

The infected lumber is treated with this solution to obtain a saturation of the wood as far as possible. One method adapted to the treatment of poles is to drill a cavity in the top of a pole and keep this filled with the germicidal solution for some time; in a few days the acids will penetrate into the lumber, killing the termites therein. Solution splashed on live insects will kill them in a few seconds. For different insects different methods of employing my insecticidal solution will prove most effective.

I claim as my invention:

1. A germicide containing as its active ingredient an acidic oily liquid separated from an Edeleanu extract of a mineral oil, from which extract substantially all sulfur dioxide was distilled off, by subjecting said extract to a neutralizing treatment with an aqueous alkali solution, separating the spent aqueous solution from the neutral extract, and adding a quantity of mineral acid to the solution to cause the separation of said oily liquid from the aqueous solution.

2. A poultry spray consisting of a neutral Edeleanu extract of an orchard spray oil of about 60 sec. Saybolt viscosity at 100° F. and a germicide containing as its active ingredient an acidic oily liquid separated from an Edeleanu extract of a mineral oil, from which extract substantially all sulfur dioxide was distilled off, by subjecting said extract to a neutralizing treatment with an aqueous alkali solution, separating the spent aqueous solution from the neutral extract, and adding a quantity of mineral acid to the solution to cause the separation of said oily liquid from the aqueous solution.

WALLACE J. YATES.